UNITED STATES PATENT OFFICE.

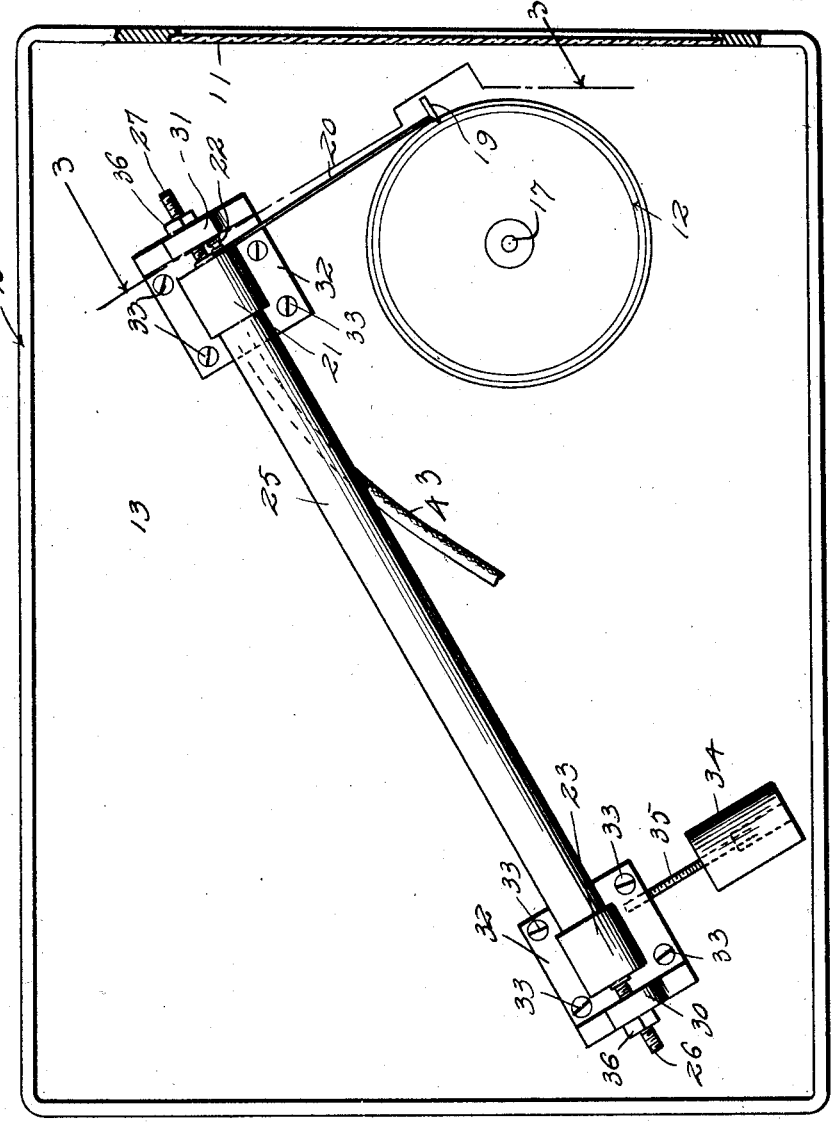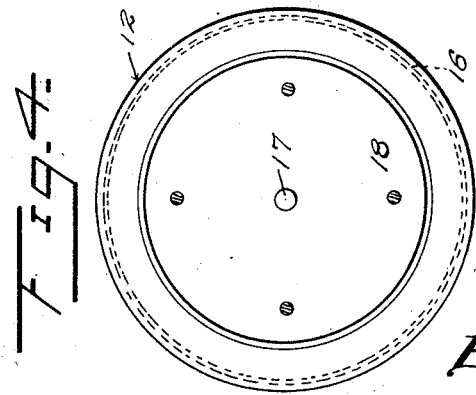

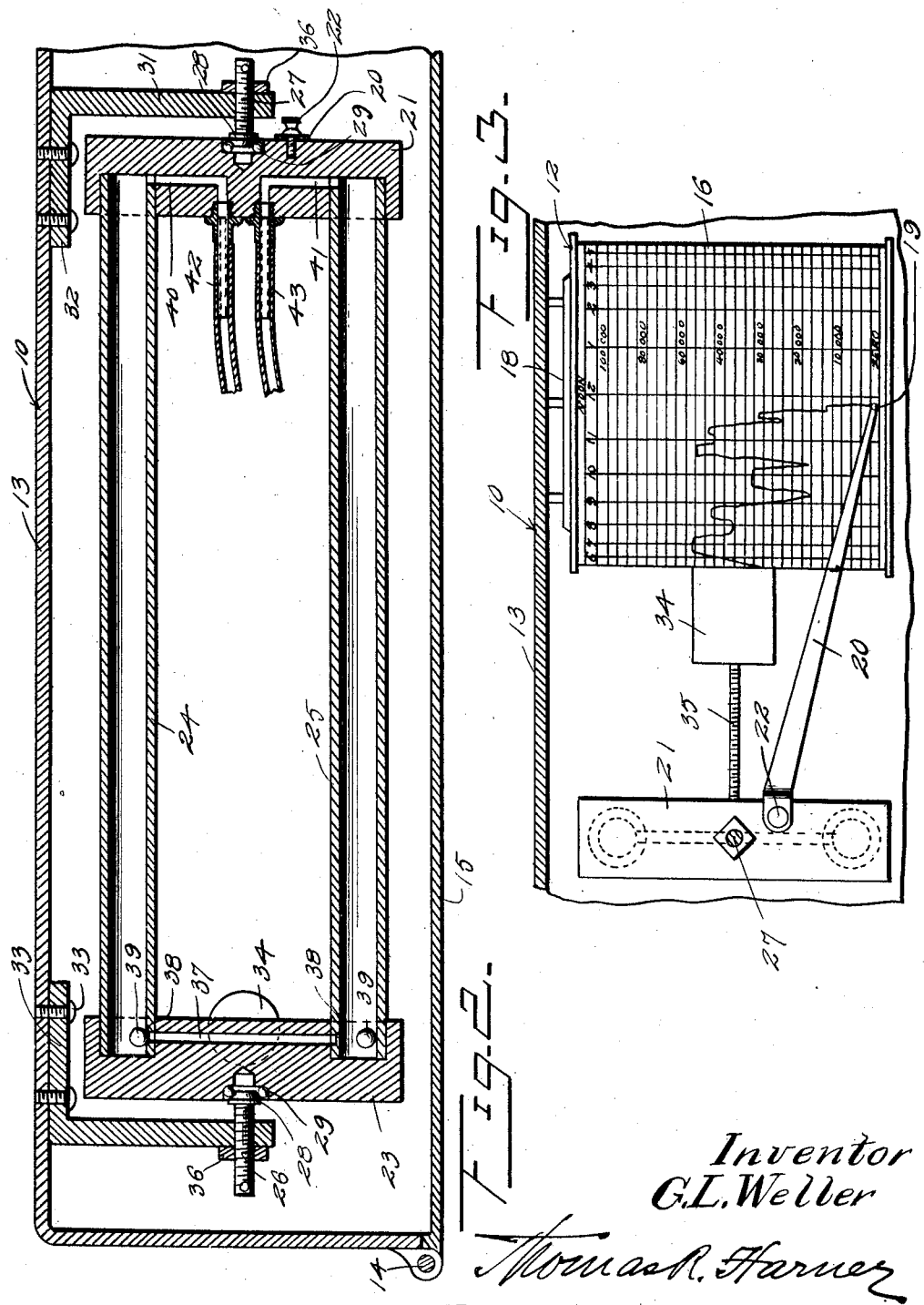

GEORGE L. WELLER, OF ELYRIA, OHIO.

MEASURING DEVICE.

1,389,723. Specification of Letters Patent. Patented Sept. 6, 1921.

Application filed November 16, 1920. Serial No. 424,343.

*To all whom it may concern:*

Be it known that I, GEORGE L. WELLER, a citizen of the United States of America, residing at Elyria, in the county of Lorain and State of Ohio, have invented certain new and useful Improvements in Measuring Devices, of which the following is a specification.

My present invention relates generally to measuring devices and more particularly to flow meters, my primary object being the provision of a meter which will measure and record the flow of air, gas, steam or water by the differential pressures created by the well known Pitot tube with but a few simple working parts, and will avoid the complications and disadvantages of known apparatus of like nature including float chambers, floats, racks, pinions, gears, segments, cams, electrical current, batteries, transformers and the like.

A further object is the provision of a device employing mercury in but a small amount as compared with other meters for similar purposes, such as for instance the well known Venturi meter, and one which is consequently of very light weight and is thus readily portable.

In carrying out my invention for the purposes above stated, I preferably employ the construction shown in the accompanying drawings, which form a part of this specification and in which, Figure 1 is a side elevation of the complete apparatus with one side or cover of the casing removed, Fig. 2 is a sectional view taken longitudinally through the pressure oscillated member and its supports including the adjacent portions of the casing, Fig. 3 is a sectional view through the casing looking at one end of the pressure oscillated member, and Fig. 4 is a top plan view of the recording cylinder.

Referring now to these figures, my improved meter may be mounted in a casing of rectangular form, generally indicated at 10, with a glass covered window or sight opening 11 at its front, forwardly of the recording cylinder 12 so that the latter may thus be viewed through the sight opening.

One side wall of the casing, indicated at 13, is preferably rigid, but the other side wall, shown removed in Fig. 1, may be hingedly connected to the casing at its rear as for instance indicated at 14 in Fig. 2 so as to form a cover 15 normally closing the respective side of the casing and at the same time providing for ready access to the inside thereof.

The recording cylinder 12 may have a chart 16 thereon, calibrated transversely to accord with the various flow rates of the different materials, that is air, gas, steam or water and divided circumferentially into the different periods of time, each chart preferably running for twenty-four hours. The recording cylinder rotates on a spindle 17 in connection with the usual clock case partially indicated at 18 in Fig. 4 and which I have not further detailed in view of the fact that various forms of clock mechanism are now known for this purpose and freely to be had in the open market. The surface of the chart 16 is engaged by a pen 19, at the free end of a pen arm 20, whose opposite end is rigidly secured to the connecting header 21 at one end of a pressure oscillated member which I will presently describe, the rigid connection of the pen arm being effected by a thumb screw 22, at a point at one side of the center or bearing point of the header 21 as clearly evident from a comparison of Figs. 2 and 3.

The pressure oscillated member in the simple form proposed by my invention includes, in addition to the header 21, a header 23, and further includes a pair of spaced apart parallel mercury tubes 24 and 25 whose opposite ends are secured in the headers 21 and 23 so as to thus form with the headers an oscillatable frame, movable by virtue of adjustable bearing pins 26 and 27 whose inner headed ends 28 engage antifriction bearings 29 set into the outer surfaces of the headers 21 and 23 centrally between the ends of the latter.

The bearing pins 26 and 27 are threaded through bearing brackets 30 and 31, these brackets having apertured flanges 32 by means of which they are screwed or otherwise fastened to the rigid side wall 13 of the casing 10, the fastening members being indicated at 33, and it will be noted from an inspection of Fig. 1 in particular that the brackets are secured in lengthwise and vertically spaced relation so as to face one another on an incline and thus movably support the pressure oscillated frame in an inclined plane which will cause the mercury, with which the tubes 24 and 25 are partly filled, to settle to the lower ends of the tubes.

The pressure oscillated frame is normally held in a perfectly level position by means of a counterweight 34, threaded, and therefore adjustable, upon the lower end of a threaded rod 35, whose upper end is preferably fixed in the lower connecting header 23 of the frame, and thus with the bearing pins 26 properly set and locked by lock nuts 36 against the outer surface of brackets 30 and 31, it is quite evident that the mercury tubes 24 and 25 will be maintained in the same horizontal plane and by proper proportioning of the parts the pen 19 will be held in this position at the zero point on the chart 16.

Referring now to Fig. 2 in particular it will be noted that the lower header 23 has a channel 37 communicating between the lower ends of the tubes 24 and 25, and that valve seats 38 are formed at opposite ends of channel 37 within the tubes 24 and 25, with which ball valves 39 are adapted to coact under certain circumstances to be presently described, these balls being freely movable in the tubes 24 and 25 and adapted to normally float freely upon the surface of the mercury in the mercury columns of the tubes.

The upper header 21 of the oscillatable frame has a pair of channels 40 and 41, respectively in communication at one end with the upper ends of the tubes 24 and 25, which channels 40 and 41 are separate from one another and are in communication at their opposite ends with flexible pressure connections 42 and 43, leading from a source of differential pressure of any suitable nature so that these pressures thus supplied within the upper ends of the tubes 24 and 25 will regulate the mercury columns in the tubes in conformity with the varying pressures.

The result of this, the intended operation, is that upon increase in the height of the mercury column in one tube with a corresponding decrease of the column in the other tube, one side of the pressure oscillated frame will be heavier than the other, and the frame will oscillate to the extent of this difference in weight and will shift the pen arm and pen across the recording chart to the extent of such oscillation. This oscillation is of course under control of the counterweight 34 to the extent that when the pressures again equalize permitting the mercury columns to seek the normal uniform height, the frame will be swung back to its normal position in which the tubes 24 and 25 are in the same horizontal plane.

In this operation the mercury is of necessity free to pass through the connecting channel 37 of the lower header 23, the ball valves 39 being inactive until excessively varying pressure practically exhausts the mercury from one column. In this column the ball 39 in the exhausted column is forced into its respective seat 38 at the adjacent end of channel 37 and thus closes the same to prevent pressure from passing through the channel 37 and to thus prevent any further raise of the mercury column in the other tube which might otherwise force the mercury to pass out of the upper pressure supply channel 40, 41.

By the apparatus above described, which is exceedingly simple and may be easily maintained in effective condition at all times, I am enabled to do away with the complicated working parts of meters heretofore proposed for a similar purpose, and I am also enabled to obtain the desired results with but a small amount of mercury as compared to those meters employing mercury and now in use. The resulting advantages in low initial cost as well as cost of upkeep and materially reduced weight, bringing about more ready portability, can be readily seen, and it is also readily to be seen that with my improved apparatus I attain these advantages without loss in effectiveness or efficiency in the measuring operation.

I claim:

1. A meter including a rotating recording chart, a pen engaging the chart, a pen arm at one end of which the pen is supported, a counterweighted member oscillatably disposed in an inclined plane and to a portion of which said pen arm is connected, said member having spaced parallel mercury columns in communication at their lower ends, and pressure supply connections independently communicating with the upper ends of the mercury columns, as described.

2. A device of the character described including an oscillatable counterweighted frame disposed in an inclined plane, having spaced parallel mercury columns in communication at their lower ends, pressure supply connections leading to the upper ends of said columns, supports in which the frame is oscillatable, and means for recording oscillating movements of the frame.

3. A device of the character described including an oscillatable counterweighted frame disposed in an inclined plane, having spaced parallel mercury columns in communication at their lower ends, pressure supply connections leading to the upper ends of said columns, and supports in which the frame is oscillatable.

4. A device of the character described including an oscillatable counterweighted frame disposed in an inclined plane, having spaced parallel mercury columns in communication at their lower ends, pressure supply connections leading to the upper ends of said columns, and supports in which the frame is oscillatable, and means to cut off communication between the lower ends of the mercury columns when mercury is exhausted from either of the columns, as described.

5. A device of the character described including a pair of spaced parallel and inclined mercury tubes in communication with one another at their lower ends and having flexible pressure supply connections in communication with their upper ends, rigid connections between the tubes at their upper and lower ends and forming therewith a rigid frame, bearing supports in which the frame ends are pivoted in a line centrally between, and parallel with, the tubes, and a counterweight having connection with the frame to resist oscillation thereof on said pivots.

6. A device of the character described including an inclined oscillating pressure actuated member including a pair of spaced parallel mercury tubes, a flexible pressure supply connection communicating with the upper end of each tube, headers into which the opposite ends of the tubes are rigidly connected, the lower of which headers has a channel communicating between the lower ends of the tubes, a counterweight connected to and depending from one of the headers, and bearing members movably engaging the headers centrally thereof and forming pivots in a line parallel with, and between, the mercury tubes.

7. A device of the character described including an inclined oscillating pressure actuated member including a pair of spaced parallel mercury tubes, a flexible pressure supply connection communicating with the upper end of each tube, headers into which the opposite ends of the tubes are rigidly connected, the lower of which headers has a channel communicating between the lower ends of the tubes, a counterweight connected to and depending from one of the headers, and bearing members movably engaging the headers centrally thereof, said channel of the lower header having valve seats at its opposite ends, and valves for coöperation with said seats.

8. A device of the character described including an inclined oscillating pressure actuated member including a pair of spaced parallel mercury tubes, a flexible pressure supply connection communicating with the upper end of each tube, headers into which the opposite ends of the tubes are rigidly connected, the lower of which headers has a channel communicating between the lower ends of the tubes, a counterweight connected to and depending from one of the headers, and bearing members movably engaging the headers centrally thereof, and ball valves movable freely in the mercury tubes and normally floating on the surface of the mercury therein, to seat within the ends of the said communicating channel whereby to cut off communication between the tubes when mercury is exhausted from either of the tubes.

In testimony whereof I have affixed my signature.

GEORGE L. WELLER.